United States Patent
Bendahan et al.

(10) Patent No.: US 11,536,871 B2
(45) Date of Patent: Dec. 27, 2022

(54) VEHICLE INSPECTION CONTROLLED USING IMAGE INFORMATION

(71) Applicant: Smiths Detection Inc., Edgewood, MD (US)

(72) Inventors: Joseph Bendahan, San Jose, CA (US); Alan Henley, Alcoa, TN (US)

(73) Assignee: Smiths Heimann SAS, Vitry-sur-Seine (FR)

( * ) Notice: Subject to any disclaimer, the term of this patent is extended or adjusted under 35 U.S.C. 154(b) by 0 days.

(21) Appl. No.: 17/211,196

(22) Filed: Mar. 24, 2021

(65) Prior Publication Data
US 2021/0302615 A1 Sep. 30, 2021

(30) Foreign Application Priority Data
Mar. 25, 2020 (GB) ..................... 2004325

(51) Int. Cl.
*G01V 5/00* (2006.01)
(52) U.S. Cl.
CPC .......... *G01V 5/0066* (2013.01); *G01V 5/0041* (2013.01)
(58) Field of Classification Search
None
See application file for complete search history.

(56) References Cited

U.S. PATENT DOCUMENTS

| | | | |
|---|---|---|---|
| 8,275,091 B2 | 9/2012 | Morton et al. | |
| 8,295,433 B2 | 10/2012 | Linev | |
| 9,025,731 B2 | 5/2015 | Kotowski et al. | |
| 9,052,403 B2 | 6/2015 | Morton et al. | |
| 9,086,496 B2 | 7/2015 | Shedlock et al. | |
| 9,086,497 B2 | 7/2015 | Bendahan | |
| 9,835,756 B2 | 12/2017 | Morton | |
| 2011/0222733 A1 | 9/2011 | Smith | |

(Continued)

FOREIGN PATENT DOCUMENTS

| | | |
|---|---|---|
| CN | 204287511 U | 4/2015 |
| EP | 3040742 A1 | 7/2016 |

OTHER PUBLICATIONS

International Search Report and Written Opinion, dated Jun. 4, 2021, for related International Application No. PCT/US2021/023912 (12 pgs).

(Continued)

*Primary Examiner* — Hoon K Song
(74) *Attorney, Agent, or Firm* — Armstrong Teasdale LLP (57) ABSTRACT

A method for inspecting at least one vehicle with an inspection system, the inspection system and the at least one vehicle being configured to move relative to one another during an inspection of at least one part, the method including controlling, by a controller, an inspection dose of inspection radiation generated by a radiation source such that, during the inspection of the at least one part of the vehicle by the inspection radiation, the inspection dose remains substantially equal to a predetermined inspection dose, wherein controlling the inspection dose includes the controller obtaining image information representative of a location of the at least one part, and location information representative of a location of the at least one part, wherein the image information is obtained from an image of the vehicle, and the controller controlling the radiation source, based on the obtained information.

13 Claims, 4 Drawing Sheets

(56) References Cited

U.S. PATENT DOCUMENTS

| | | |
|---|---|---|
| 2012/0068092 A1 | 3/2012 | Tay |
| 2013/0195244 A1 | 8/2013 | Hosokawa |
| 2015/0139386 A1* | 5/2015 | Star-Lack .............. G01N 23/06 378/57 |
| 2015/0219785 A1 | 8/2015 | Fudor et al. |
| 2016/0025891 A1* | 1/2016 | Morton ................... G21K 1/04 378/57 |
| 2016/0033674 A1 | 2/2016 | Allman et al. |
| 2018/0341039 A1 | 11/2018 | Karas et al. |
| 2019/0187324 A1* | 6/2019 | Vienne ................... G01N 23/10 |

OTHER PUBLICATIONS

International Search Report and Written Opinion for International Patent Application No. PCT/US2021/023906, dated Jun. 28, 2021, 11 pages.

Search Report issued in GB Application No. 2004327.9, dated Aug. 28, 2020, 3 pages.

* cited by examiner

VEHICLE INSPECTION CONTROLLED USING IMAGE INFORMATION

CROSS-REFERENCE TO RELATED APPLICATIONS

This patent application claims priority to GB Application No. 2004325.3 filed on Mar. 25, 2020, the disclosure of which is hereby incorporated by reference herein in its entirety as part of the present application.

FIELD OF INVENTION

The present disclosure relates, but is not limited, to methods and systems for inspecting a vehicle, e.g. including a cabin configured to be occupied by at least one person, an engine and cargo.

BACKGROUND

Inspection systems use radiation through vehicles for inspecting cargo of the vehicle, for example to detect hidden objects, such as weapons, dangerous materials, explosives, drugs and general contraband. The inspection systems may be placed at borders and at the entrance of sensitive facilities. X-rays are typically used for inspection radiation, because X-rays penetrate the vehicles and allow seeing contraband concealed within the car in a non-intrusive way.

Strict regulations limit the dose to which people (e.g. drivers and passengers) of the vehicles may be exposed.

In a "scanning" mode of inspection, the drivers and the passengers of the vehicles usually step down of the vehicles in order to avoid being irradiated and the inspection systems (e.g. including a gantry with the X-ray source and detectors) move with respect to the vehicles to inspect them. The scanning mode has a relatively small overall vehicle throughput of inspection (around 20 or 25 vehicles per hour), and the inspection systems are relatively expensive because they must be configured to be mobile. In a "car-wash" mode of inspection, the X-ray source and detectors are stationary and the vehicle is translated. The "car-wash" mode also has a relatively small overall vehicle throughput of inspection. The scanning mode and the "car-wash" mode are non-compatible with well transited border crossings.

A higher throughput (e.g. between 100 and 200 vehicles per hour) may be obtained in a "pass-through" mode of inspection, where the driver may stay in the vehicle and drives the vehicle through a portal with the X-ray source and detectors. In some examples, radiation emission only starts after the cabin has passed a zone of inspection—but the cabin is not inspected, which prevents detection of hidden objects in the cabin. In some examples, the drivers and any passengers are exposed, while they are driving through the portal, to a radiation dose and the cabin is inspected. The radiation dose to which the drivers and passengers are exposed should not exceed a maximum dose allowed by radiation regulations. The radiation source could be configured to have an allowed maximum radiation dose for a given nominal inspection driving speed of the vehicle through the portal.

Detectors may detect when a front bumper of the vehicle pass a point in the inspection system to trigger inspection and radiation inspection.

However, drivers may not drive at the nominal inspection driving speed. Driving at different speeds may result in exposure of a part of the vehicle to a wrong radiation dose. The wrong radiation dose may exceed the maximum dose of exposure of people in the vehicle. The wrong radiation dose may result in lower image quality, as lower dose could result in dark areas in a corresponding inspection image where the presence e.g. of contraband may not be determined.

Aspects of the present disclosure address some of the above issues.

SUMMARY OF INVENTION

Aspects and embodiments of the disclosure are set out in the appended claims. These and other aspects and embodiments of the disclosure are also described herein.

PRESENTATION OF THE FIGURES

Embodiments of the disclosure will now be described, by way of example only, with reference to the accompanying drawings, in which.

In the drawings, like elements are referred to by the same numerical references.

DESCRIPTION OF EXAMPLE EMBODIMENTS

Overview

The disclosure is concerned with a method for inspecting at least one vehicle with an inspection system. To enable inspection using a scan movement, the inspection system and the vehicle may move relative to one another during an inspection of the vehicle. The vehicle is inspected using inspection radiation having an inspection dose. The inspection dose is controlled such that the inspection dose remains substantially equal to a predetermined inspection dose, corresponding to a part of the vehicle. The controlling of the inspection dose includes obtaining image information representative of a location of the part of the vehicle in the vehicle, and location information representative of a location of the part of the vehicle with respect to the radiation source. The controlling of the inspection dose also includes controlling a radiation source generating the inspection radiation, based on the obtained information.

The image information is obtained from an image of the vehicle being inspected. In embodiments of the disclosure, the control of the radiation source is based on accurate image information. Accuracy of the control of the radiation source is enhanced.

In embodiments of the disclosure, e.g. when inspecting an area of the vehicle which is occupied by people, such as a cabin of the vehicle, and drivers drive at speeds different from the nominal inspection driving speed, the radiation source is controlled based on image information representative of the location of the person-occupied area of the vehicle in the vehicle, and location information representative of the location of the person-occupied area of the vehicle with respect to the radiation source. Thanks to the controlling, the dose remains substantially equal to a predetermined dose, which may be equal to or slightly lower than the maximum dose allowed to expose passengers in a single scan by the regulations (e.g. a regulatory dose). The regulations limit the allowed dose received by people. The dose received by people is obtained by multiplying the inspection dose rate (i.e. the dose per unit of time, e.g. mSv/hour) by the time the person is exposed to the radiation. By controlling the inspection dose rate when the exposure time may vary (e.g. because the driving speed is different from the nominal inspection driving speed) such that the dose remains substantially equal to the predetermined dose for the person-occupied area, the inspection does not result in the driver and passengers being exposed to a dose that exceeds the maximum inspection dose.

The above examples concern inspection of a part of the vehicle including the person-occupied areas of the vehicle. Other predetermined inspection doses may correspond to other parts of the vehicle, such as parts including an engine or parts including a trailer or a boot being configured to carry cargo. Embodiments of the disclosure for these other parts of the vehicle (such as the engine or the trailer) enhance image quality, as the dose may be increased for the parts of the vehicle which are not occupied by people (the dose is not limited to the dose allowable to people).

The inspection dose rate is controlled such that the dose corresponds to the part of the vehicle, based on the obtained image information and the obtained location information. Regardless of the part of the vehicle, the inspection results in an enhanced image quality.

Detailed Description of Example Embodiments

Figure 1:
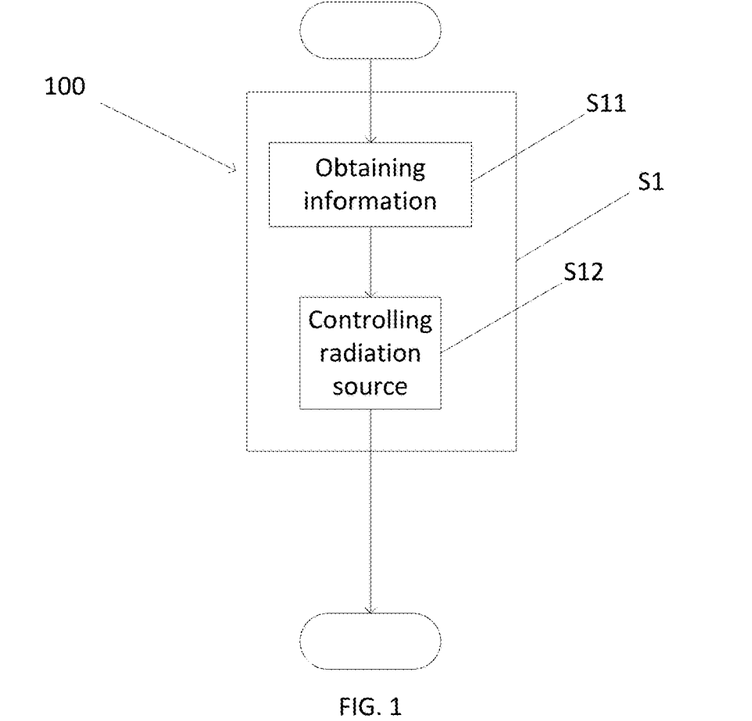
FIG. 1 is a flowchart that schematically illustrates an example method for inspecting a vehicle.

FIG. 1 is a flowchart that schematically illustrates an example method 100 for inspecting a vehicle.

The method 100 illustrated at FIG. 1 mainly includes controlling, at S1, by a controller, an inspection dose of inspection radiation generated by a radiation source such that, during the inspection of at least one part of a vehicle by the inspection radiation, the inspection dose remains substantially equal to a predetermined inspection dose.

In FIG. 1, S1 mainly includes:
the controller obtaining, at S11, image information representative of a location of the at least one part of the vehicle in the vehicle, and location information representative of a location of the at least one part of the vehicle with respect to the radiation source; and
the controller controlling, at S12, the radiation source, based on the obtained information.

The image information is obtained from an image of the vehicle being inspected.

Figure 2:
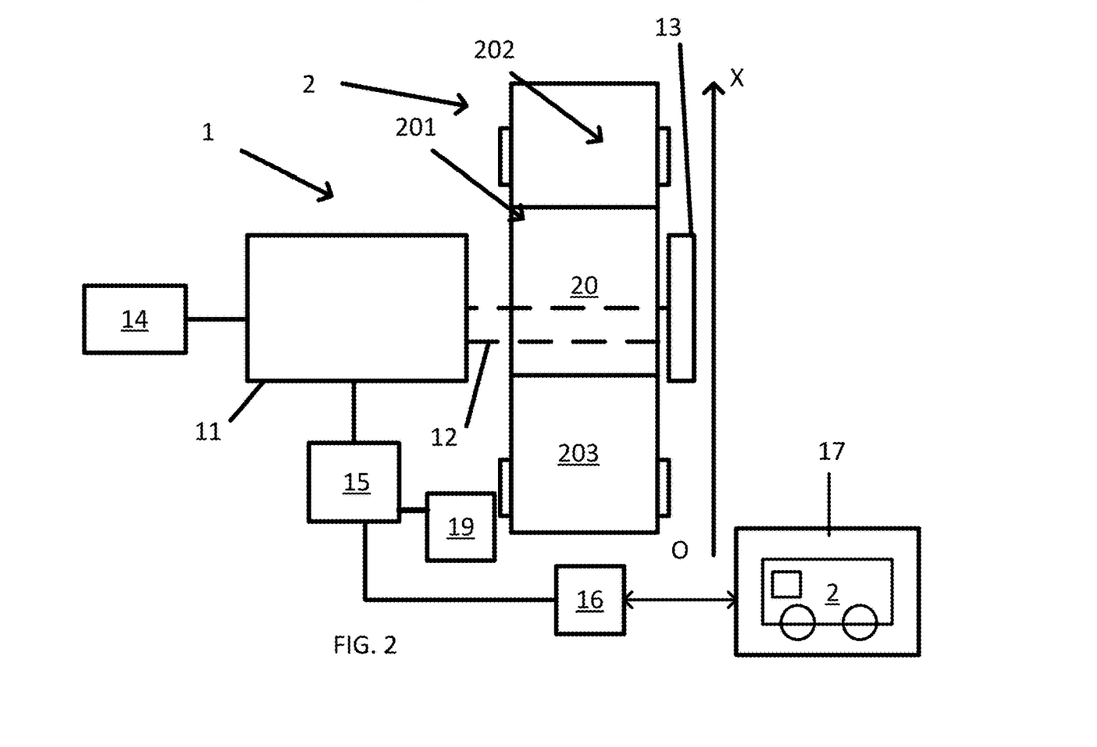
FIG. 2 schematically illustrates an example inspection system.

FIG. 2 schematically illustrates an example inspection system 1. The inspection system 1 is configured to inspect at least one vehicle 2. The vehicle 2 may include at least one of a car, a truck or a train, as non-limiting examples.

During inspection, the inspection system 1 and the at least one vehicle 2 move relative to one another, as shown by arrow (OX). In the relative movement (OX), the system 1 may be static with respect to the ground and the vehicle 2 may be moving with respect to the ground (i.e. pass-through mode). Alternatively, in the relative movement (OX), the vehicle 2 may be static with respect to the ground and the system 1 may be moving with respect to the ground (e.g. gantry).

The inspection may be to inspect at least one part 20 of the vehicle 2. In some examples, the at least one part 20 of the vehicle 2 may include a person-occupied area 201 (such as a cabin 201) being configured to be occupied by at least one person (such as a driver of the vehicle 2 and/or passengers of the vehicle 2).

As illustrated in FIG. 2, the inspection system 1 includes a radiation source 11 configured to generate inspection radiation 12. The radiation source 11 may include a pulsed source or a continuous source (such as an X-ray tube as a non-limiting example).

The inspection system 1 also includes detectors 13 configured to detect the transmitted inspection radiation 12 after it has irradiated the vehicle 2.

As illustrated in FIG. 2, the radiation source 11 may be configured to be powered by an electrical power source 14, and the radiation source 11 is connected to the electrical power source 14.

As illustrated in FIG. 2, an image processor 16 is configured to generate image information. The image information is representative of the location of the at least one part 20 of the vehicle in the vehicle 2.

The image information is generated from an image 17 of the vehicle 2 being inspected and is generated with enhanced accuracy.

Figure 3A:
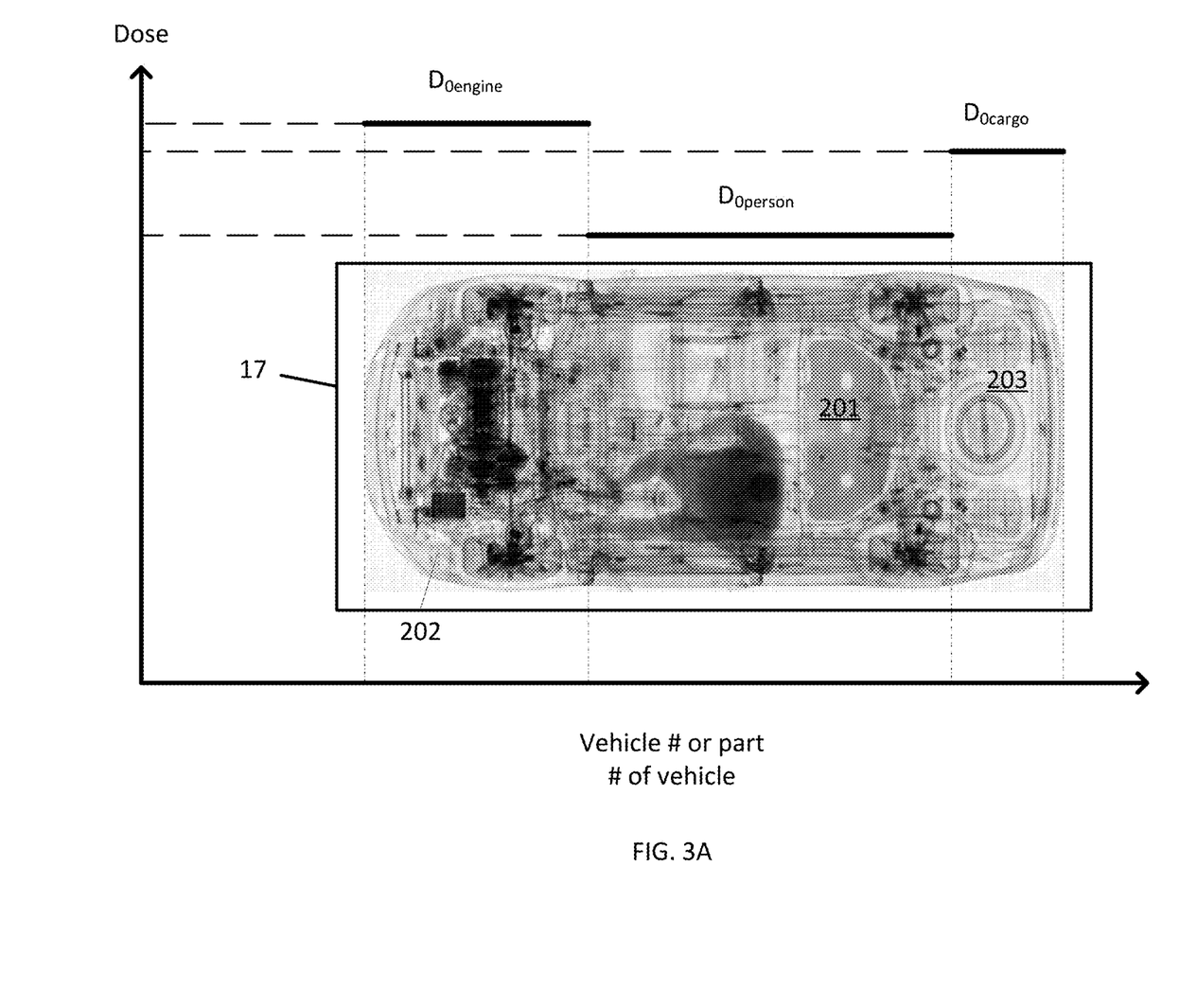
FIG. 3A schematically illustrates a first example of control of the inspection dose based on obtained information, with the inspection dose being different for different parts of the vehicle.
Figure 3B:
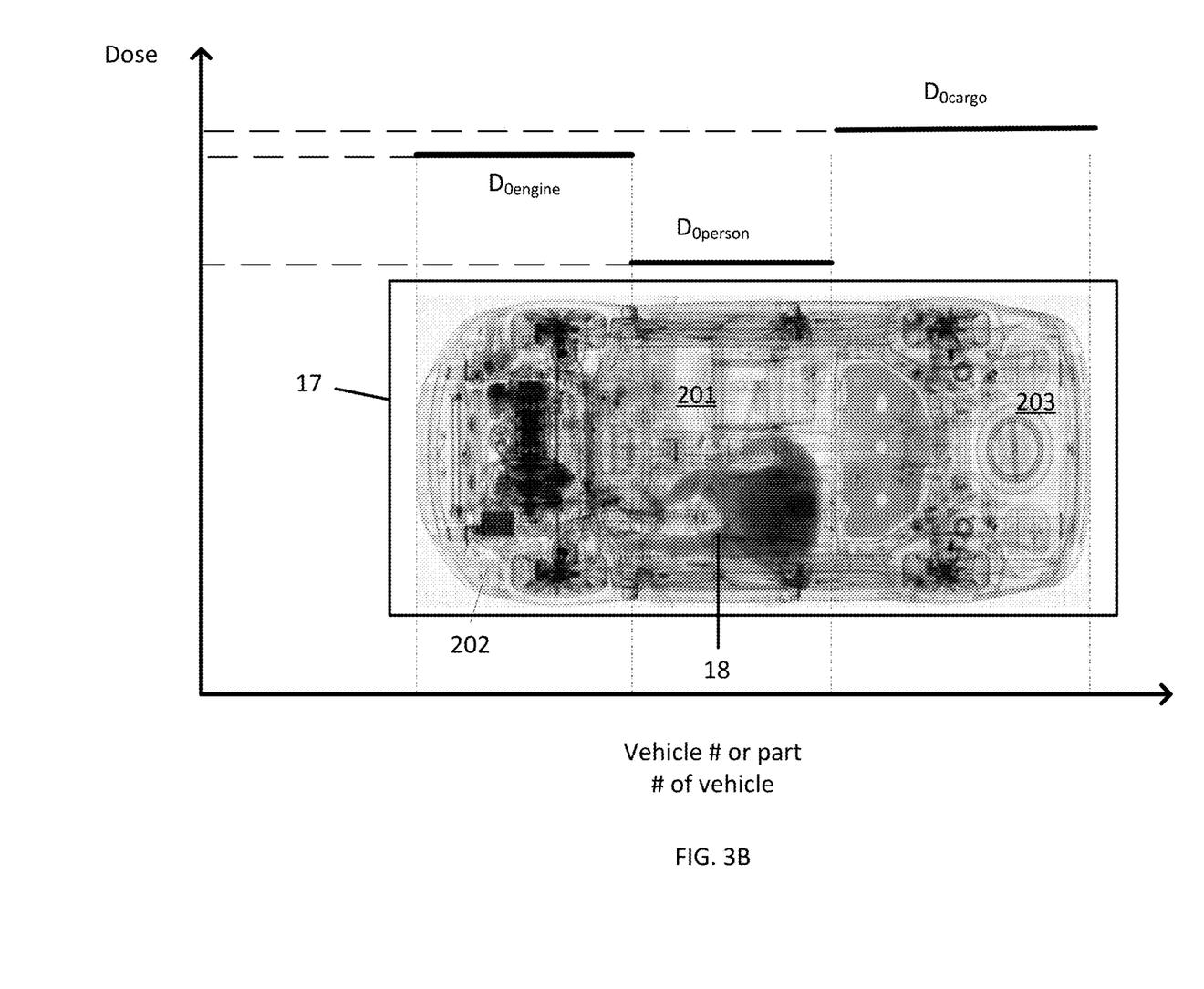
FIG. 3B schematically illustrates a second example of control of the inspection dose based on obtained information, with the inspection dose being different for different parts of the vehicle, the image information including information representative of whether or not a person occupies the vehicle.

In non-limiting examples, the image 17 of the vehicle 2 may include at least one X-ray scan (as illustrated in FIGS. 3A and 3B—such as a top view scan—but side view scans may also be envisaged). The X-ray scan 17 may be obtained with the inspection system 1 or with another inspection system (not shown on the figures).

Figure 4A:
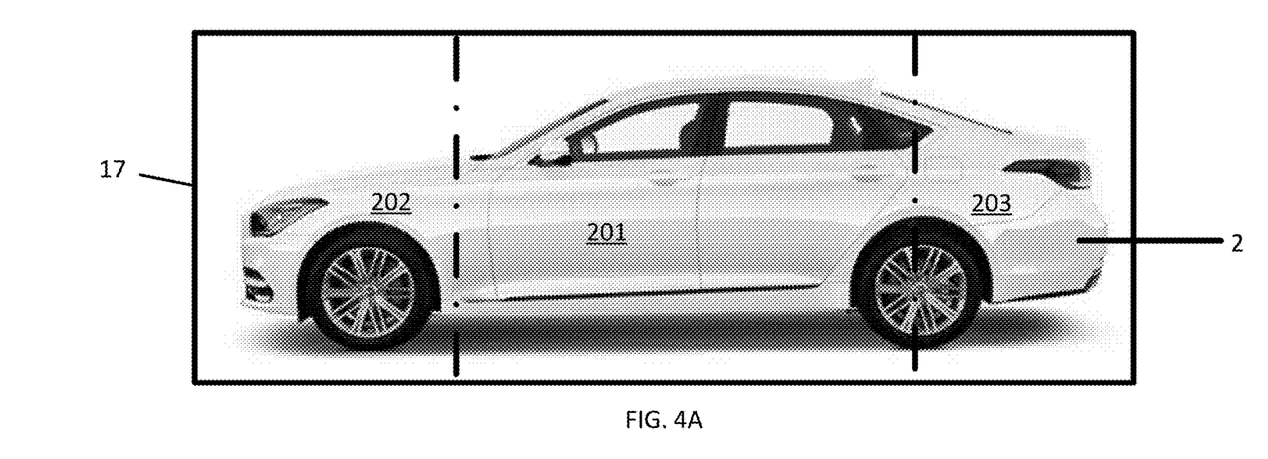
FIGS. 4A and 4B schematically illustrate examples of images of the vehicle being inspected, the images being captured by a camera.
Figure 4B:
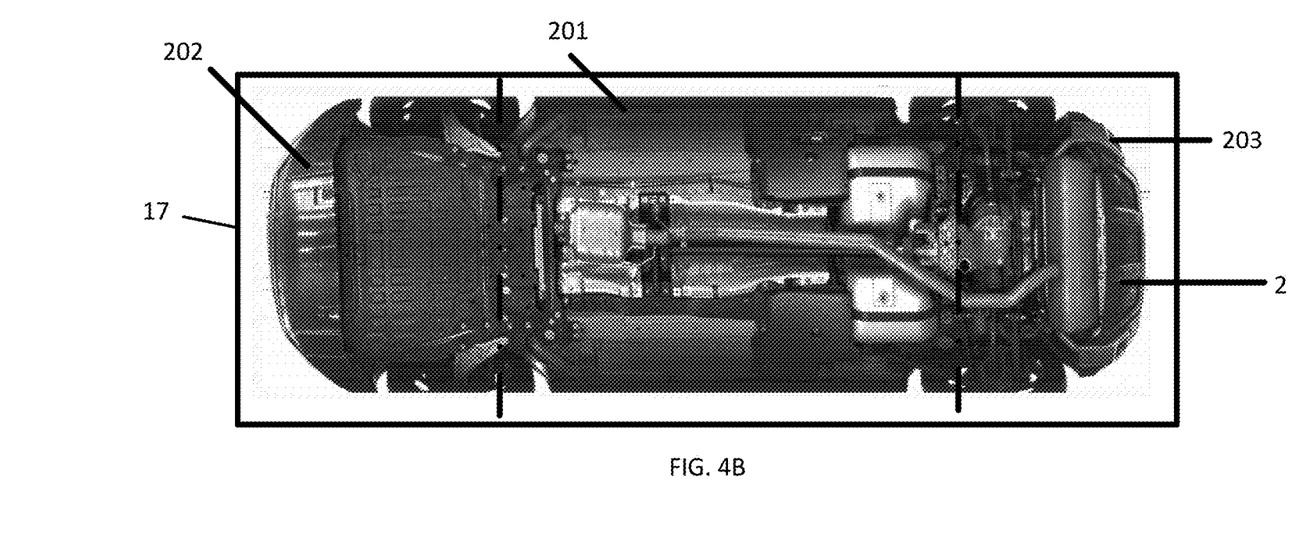

As illustrated in FIG. 4A, the image 17 may be a still image or an image from a video, captured by a camera (not shown on the figures). In FIG. 4A the image 17 is a side view of the vehicle 2. As illustrated in FIG. 4B, the image 17 may be a still image or an image from a video, captured by an undercarriage camera.

Alternatively or additionally, the image may be a Lidar image. Alternatively or additionally, the image may be an infra-red image.

The image processor 16 is configured to accurately determine, from the image 17, the location of the parts 20 of the vehicle in the vehicle 2. The image processor 16 is configured to accurately determine, from the image 17 of the vehicle 2 being inspected:
the location of the part 202 including the engine of the vehicle 2, the engine 202 being configured to cause movement of the vehicle 2; and/or
the location of the area 201 configured to be occupied by people (such as the cabin); and/or
the location of the part 203 including at least one of a trailer 203 or a boot 203 being configured to carry cargo.

As illustrated in FIG. 3A, the area 201 may be determined as an area of the vehicle 2 which is merely configured to be occupied by people in the vehicle 2.

Alternatively or additionally, the image information generated by the image processor 16 may further include information representative of whether or not a person actually occupies the area 201. As illustrated in FIG. 3B, the area 201 may be determined as an area of the vehicle which is actually occupied by a person 18 in the vehicle 2. As can be seen by comparing FIGS. 3A and 3B, for the same image 17 of the same vehicle 2 occupied by the same person 18, the area 201 determined in FIG. 3B is smaller than the area 201 determined in FIG. 3A. In some examples, the image information may be obtained from a still image captured by a camera, but other examples are possible. Alternatively or additionally the image information may be obtained from a two-step scan where a low dose x-ray scan is performed first to determine where the persons are located, and then a second scan is performed to reduce the dose where the people actually are (e.g. as shown in FIG. 3B). A distance between the two scans may be provided to allow enough time to analyze the image.

Alternatively or additionally, the image information includes information representative of at least one of a brand and model of the vehicle being inspected or a registration plate of the vehicle being inspected.

In some examples, the image processor 16 may extract, from the image 17, the information representative of the brand and model of the vehicle 2. Alternatively or additionally, the image processor 16 may extract, from the image 17, the information representative of the registration plate of the vehicle 2. Assuming that stored records including the image information may be accessed by the image processor 16, the registration plate may provide the brand and model of the vehicle 2. The brand and model of the vehicle 2 may be related to the respective locations of the parts (e.g. 201, 202 and 203) of the vehicle in the vehicle 2. The respective locations may be stored in the records, e.g. in a memory of the image processor 16 or in a database (not shown in the figures) which may be accessed by the image processor 16. In some examples the records may be generated and/or updated each time a particular vehicle is inspected.

As illustrated in FIG. 2, the inspection system 1 also includes a controller 15. The controller 15 is configured to obtain the image information representative of the location of the at least one part 20 of the vehicle in the vehicle 2, e.g. from the image processor 16.

It will now be explained how the location information may be obtained by the controller 15.

In some examples, the image processor 16 may further be configured to accurately determine, from the image 17, the location information representative of the location of the at least one part 20 of the vehicle 2 with respect to the radiation source 1.

Alternatively or additionally, as illustrated in FIG. 2, the location information may be obtained by the controller 15 from a sensor 19 configured to determine that the at least one part 20 of the vehicle 2 enters a zone of inspection defined by the radiation source 1. As non-limiting examples, the sensor 19 may include at least one of: optical sensors (such as including lasers and/or optical cameras), and/or mechanical sensors (such as a mechanical switch), and/or sensors configured to sense radio waves (such as radars).

The controller 15 is also configured to control the radiation source 11, based on the obtained information. Accuracy of the control of the radiation source 1 is enhanced, using the image information and the location information.

In some examples the controller 15 may be configured to control the radiation source 11 through an interface (e.g. Ethernet interface).

In an example, the radiation source 11 may be configured to generate the inspection radiation 12 with a current intensity I. The radiation source 11 may be an X-ray radiation source (such as an X-ray source or an X-ray source including a linac or a betatron). In that case, the current is an electron current, and the electrons impinge unto a target (with the intensity I) to generate the X-ray radiation 12. Alternatively or additionally, the radiation source 11 may be a neutron radiation source. In that case, the current is at least one of a proton current or a deuteron current, and the particles (protons or deuterons) impinge unto a target with the intensity I to generate the neutron radiation 12.

In that case, as shown in FIG. 1 controlling at S12 the radiation source 11 may include controlling the current intensity I based on the obtained information. When the current intensity I impinging the target in the source 11 increases, the number of X-rays generated by the radiation source 11 also increases, and the dose irradiating the vehicle 2 increases linearly.

In that case, the predetermined inspection dose $D_0$ may be associated with a nominal current intensity $I_0$.

The inspection dose D received by the vehicle 2 during the inspection may vary along with the speed V of the relative movement (OX). For example, the inspection dose D received by the vehicle 2 or the part 20 of the vehicle 2 may be greater than the predetermined inspection dose $D_0$ when the speed V of the mutual movement (OX) is lower than the nominal inspection speed $V_0$. Similarly, the inspection dose D received by the vehicle 2 or the part 20 of the vehicle 2 may be lower than the predetermined inspection dose $D_0$ when the speed V of the mutual movement (OX) is greater than the nominal inspection speed $V_0$.

In some examples, the predetermined inspection dose $D_0$ corresponds to a person-occupied area (such as the cabin) inspection dose $D_{0person}$. It should be understood that the person-occupied area inspection dose $D_{0person}$ is lower than or substantially equal to a regulatory dose which is safe for the at least one person occupying the area 201 during the inspection of the area 201. The person (e.g. the driver or the passenger) may thus be exposed to the person-occupied area inspection dose $D_{0person}$. However, the person-occupied area inspection dose $D_{0person}$ enables inspection by irradiation of the area 201 by the inspection radiation 12. In some examples corresponding to the ANSI N43.17 standard, the regulatory dose corresponds to a dose substantially equal to 250 nSv per inspection. Other standards, regulatory doses and person-occupied area inspection doses may also be envisaged.

In that example, the controller 15 controls at S12 the current intensity I of the radiation source 11, based on the obtained information, such that:

$$I = \alpha_i \cdot I_0$$

where $\alpha_i$ is a coefficient corresponding to the at least one part $p_i$ of the vehicle to be irradiated and selected based on the obtained image information.

For example for a part $p_1$ corresponding to the part 201, the coefficient $\alpha_1$ may be selected so that the dose corresponds to $D_{0person}$ as illustrated in FIGS. 3A and 3B.

Therefore, by such a controlling of the intensity I, the inspection dose of the inspection radiation 12, during the inspection of the person-occupied area 201 of the vehicle 2 by the inspection radiation 12, remains substantially equal to the predetermined inspection dose $D_{0person}$.

The method 100 may be performed by the controller 15 in real time or near real time.

Alternatively or additionally, in some examples, the at least one part 20 of the vehicle 2 may include the engine 202. The engine 202 is denser than the person-occupied area 201 and is not configured to be occupied by a person. The predetermined inspection dose $D_0$ may thus correspond to an engine inspection dose $D_{0engine}$ enabling inspection by irradiation of the engine by the inspection radiation. It should be understood that:

$$D_{0engine} >> D_{0person}$$

Similarly to the control performed by the controller 15 during inspection of the person-occupied area 201, during inspection of the engine 202 of the vehicle 2, the controller 15 may control at S12 the intensity I of the radiation source 11, such that the inspection dose rate of the inspection radiation 12 remains substantially equal to the predetermined inspection dose rate $D_{0engine}$.

For example for a part $p_2$ corresponding to the part 202, the coefficient $\alpha_2$ may be selected so that the dose corresponds to $D_{0engine}$ as illustrated in FIGS. 3A and 3B.

Alternatively or additionally, in some examples, the at least one part 20 of the vehicle 2 may include at least one of the trailer 203 or the boot 203 being configured to carry cargo. The trailer 203 or boot 203 is denser than the person-occupied area 201 and is usually not configured to be occupied by a person. The predetermined inspection dose $D_0$ may thus correspond to a cargo inspection dose $D_{0cargo}$ enabling inspection by irradiation of the trailer 203 and/or the boot 203 by the inspection radiation by the inspection radiation.

Similarly to the control performed by the controller 15 during inspection of the person-occupied area 201 and/or of the engine 202, during inspection of the trailer 203 and/or boot 203 of the vehicle 2, the controller 15 may control at S12 the intensity I of the radiation source 11, such that the inspection dose of the inspection radiation 12 remains substantially equal to the predetermined inspection dose $D_{0cargo}$.

For example for a part $p_3$ corresponding to the part 203, the coefficient $\alpha_3$ may be selected so that the dose corresponds to $D_{0cargo}$ as illustrated in FIGS. 3A and 3B.

A typical dose to cargo $D_{0cargo}$ or to engine $D_{0engine}$ may be several μSv per scan as a non-limiting example. As illustrated in FIGS. 3A and 3B, $D_{0cargo}$ may be greater or smaller than $D_{0engine}$, depending on the cargo and the engine.

In the developments above, the controller 15 is configured to control the current intensity of the radiation source 11. As already stated, the radiation source 11 may include a pulsed source 11, the pulsed source 11 being configured to generate the inspection radiation 12 at a frequency f.

In that case, controlling at S12 the radiation source 11 may include controlling the frequency f of the radiation source, based on the obtained information. In some examples the controller 15 may be configured to instruct the radiation source 11 to adjust the frequency f. When the frequency f increases, the number of X-rays generated by the radiation source 11 also increases, and the dose irradiating the vehicle 2 increases linearly.

In that case, the predetermined inspection dose $D_0$ ($D_{0engine}$ and/or $D_{0cargo}$ and/or $D_{0person}$) is associated with a nominal radiation source frequency $f_0$.

In that example, the controller 15 controls at S12 the frequency f of the radiation source 11 such that, based on the obtained image information:

$$f=\beta_i \cdot f_o$$

where $\beta_i$ is a coefficient corresponding to the at least one part $p_i$ of the vehicle to be irradiated and selected based on the obtained image information.

Therefore, by such a controlling of the frequency f, the inspection dose of the inspection radiation 12, during the inspection of the part 20 of the vehicle 2 by the inspection radiation 12, remains substantially equal to the predetermined inspection dose $D_0$ ($D_{0engine}$ and/or $D_{0cargo}$ and/or $D_{0person}$ depending on the part 20 of the vehicle 2) as illustrated in FIGS. 3A and 3B.

For example, as illustrated in FIGS. 3A and 3B:
for a part $p_1$ corresponding to the part 201, the coefficient $\beta_1$ may be selected so that the dose corresponds to $D_{0person}$;
for a part $p_2$ corresponding to the part 202, the coefficient $\beta_2$ may be selected so that the dose corresponds to $D_{0engine}$; and
for a part $p_3$ corresponding to the part 203, the coefficient $\beta_3$ may be selected so that the dose corresponds to $D_{0cargo}$.

In the developments above, the controller 15 is configured to control the current intensity and/or the frequency of the radiation source 11.

In some examples, the radiation source 11 is configured to generate the inspection radiation 12 at a radiation energy E. When the energy E increases, the energy of the X-rays generated by the radiation source 11 also increases, and the dose irradiating the vehicle 2 increases.

In that example, the controller 15 controls at S12 the radiation energy E at which the source generates the inspection radiation.

In cases where the predetermined inspection dose $D_0$ is associated with a nominal radiation energy $E_0$, controlling at S12 the radiation energy E is such that, based on the obtained information:

$$E=\gamma_i \cdot E_0$$

where $\gamma_i$ is a coefficient corresponding to the at least one part $p_i$ of the vehicle to be irradiated and selected based on the obtained image information.

For example, as illustrated in FIGS. 3A and 3B:
for a part $p_i$ corresponding to the part 201, the coefficient $\gamma_1$ may be selected so that the dose corresponds to $D_{0person}$;
for a part $p_2$ corresponding to the part 202, the coefficient $\gamma_2$ may be selected so that the dose corresponds to $D_{0engine}$; and
for a part $p_3$ corresponding to the part 203, the coefficient $\gamma_3$ may be selected so that the dose corresponds to $D_{0cargo}$.

In this case, the penetration of the radiation 12 would change because the penetration depends strongly with the radiation energy. Other performance metrics will also change.

In some examples controlling the energy E includes controlling the voltage to which the electrons and/or the particles (e.g. protons or deuterons) are submitted in the radiation source 11. With an increased voltage, the electrons and/or the particles (e.g. protons or deuterons) have increased energy that translates to higher energy of the radiation source 11.

In any aspect of the disclosure, the method may further include collimating the inspection radiation into an inspection beam configured to irradiate the vehicle.

The controller 15 is configured to perform the method of any aspect of the disclosure. The controller 15 may include a processor and a memory, the memory storing instructions which, when executed by the processor, enable the processor to perform the method of any aspect of the disclosure.

The disclosure also relates to a computer program product or a computer program including instructions which, when executed by a processor, enable the processor to perform the method of any aspect of the disclosure.

It should be understood that the performance metrics of the inspection system (including penetration, spatial resolution, wire detection, contrast, material discrimination, etc.) are related to the inspection dose.

What is claimed is:
1. A method for inspecting at least one vehicle with an inspection system, the inspection system and the at least one vehicle being configured to move relative to one another during an inspection of at least one part of the vehicle, the method comprising:

controlling, by a controller, an inspection dose of inspection radiation generated by a radiation source such that, during the inspection of the at least one part of the vehicle by the inspection radiation, the inspection dose remains substantially equal to a predetermined inspection dose, the radiation source powered by an electrical power source and generating the inspection radiation with a current intensity I, and the predetermined inspection dose associated with a nominal current intensity $I_0$, wherein controlling the inspection dose comprises:

the controller obtaining image information representative of a location of the at least one part of the vehicle in the vehicle, and location information representative of a location of the at least one part of the vehicle with respect to the radiation source, wherein the image information is obtained from an image of the vehicle; and the controller controlling the radiation source by controlling the current intensity I, based on the obtained information, wherein the current intensity is controlled according to $I=\alpha_i \cdot I_0$, where $\alpha_i$ is a coefficient corresponding to the at least one part $p_i$ of the vehicle to be irradiated and selected based on the obtained information.

2. The method of claim 1, wherein the radiation source comprises a pulsed source or a continuous source.

3. The method of claim 1, wherein:

the radiation source is an X-ray radiation source and the current is an electron current, with electrons impinging unto a target to generate the X-ray radiation; and the radiation source is a neutron radiation source and the current is at least one of a proton current or a deuteron current, with particles impinging unto a target to generate the neutron radiation.

4. The method of claim 1, wherein the at least one part of the vehicle comprises an area being configured to be occupied by a person, and wherein the predetermined inspection dose corresponds to a person-occupied area inspection dose, the person-occupied area inspection dose being lower than or substantially equal to a regulatory dose which is safe for the person occupying the area during the inspection of the area, yet enabling inspection by irradiation of the area by the inspection radiation.

5. The method of claim 4, wherein the image information further comprises information representative of whether or not a person occupies the area, or wherein the image information further comprises information representative of brand and model of the vehicle and/or of a registration plate of the vehicle, or wherein the image information is stored in records, or wherein the records are generated and/or updated each time a vehicle is inspected.

6. The method of claim 5, wherein the regulatory dose corresponds to a dose substantially equal to 250 nSv per inspection.

7. The method of claim 1, wherein the at least one part of the vehicle comprises an engine being configured to cause movement of the vehicle, and wherein the predetermined inspection dose corresponds to an engine inspection dose enabling inspection by irradiation of the engine by the inspection radiation.

8. The method of claim 1, wherein the at least one part of the vehicle comprises at least one of a trailer or a boot being configured to carry cargo, and wherein the predetermined inspection dose corresponds to a cargo inspection dose enabling inspection by irradiation of the trailer and/or a boot by the inspection radiation.

9. The method of claim 1, further comprising collimating the inspection radiation into an inspection beam configured to irradiate the vehicle.

10. The method of claim 1, wherein the image information is obtained from an image of the vehicle comprising at least one of:

an X-ray scan, a still image or an image from a video captured by a camera, optionally an undercarriage camera, a Lidar image, or an infra-red image.

11. An inspection system configured to inspect at least one vehicle, the inspection system and the vehicle being configured to move relative to one another during an inspection of the vehicle, the system comprising:

a radiation source configured to generate inspection radiation at an inspection dose enabling inspection of at least one part of the vehicle by the inspection radiation, the radiation source powered by an electrical power source and including a pulsed source that generates the inspection radiation at a frequency f; and a controller configured to control the inspection dose of the inspection radiation generated by the radiation source, based on information comprising:

image information obtained from an image processor configured to determine, from an image of the vehicle, information representative of a location of the at least one part of the vehicle in the vehicle, and location information representative of a location of the at least one part of the vehicle with respect to the radiation source, the inspection dose being controlled such that, during the inspection of the at least one part of the vehicle by the inspection radiation, the inspection dose remains substantially equal to a predetermined inspection dose associated with a nominal radiation source frequency $f_0$, wherein controlling the inspection dose comprises controlling the radiation source by controlling the frequency f of the radiation source, based on the obtained information, the frequency controlled according to $f=\beta_i \cdot f_0$, where $\beta_i$ is a coefficient corresponding to the at least one part $p_i$ of the vehicle to be irradiated and selected based on the obtained information.

12. The system of claim 11, wherein the radiation source comprises at least one of: an X-ray source, an X-ray source comprising a linac or a betatron, or a neutron source.

13. An inspection system configured to inspect at least one vehicle, the inspection system and the vehicle being configured to move relative to one another during an inspection of the vehicle, the system comprising:

a radiation source configured to generate inspection radiation at an inspection dose enabling inspection of at least one part of the vehicle by the inspection radiation, the radiation source powered by an electrical power source and generating the inspection radiation at a radiation energy E; and a controller configured to control the inspection dose of the inspection radiation generated by the radiation source, based on information comprising:

image information obtained from an image processor configured to determine, from an image of the vehicle, information representative of a location of the at least one part of the vehicle in the vehicle, and location information representative of a location of the at least one part of the vehicle with respect to the radiation source, the inspection dose being controlled such that, during the inspection of the at least one part of the vehicle by the inspection radiation, the inspection dose remains substantially equal to a predetermined inspection dose associated with a nominal radiation energy $E_0$, wherein controlling the inspection dose comprises controlling the radiation source by controlling the energy $E$ of the radiation source, based on the obtained information, the energy controlled according to $E=\gamma_i \cdot E_0$, where $\gamma_i$ is a coefficient corresponding to the at least one part $p_i$ of the vehicle to be irradiated and selected based on the obtained information.

\* \* \* \* \*